(12) United States Patent
Lin

(10) Patent No.: US 6,774,779 B2
(45) Date of Patent: Aug. 10, 2004

(54) VEHICLE SECURITY SYSTEM WITH TIRE MONITORING DEVICE

(75) Inventor: Sheng Hsiung Lin, Kaohsiung (TW)

(73) Assignee: Lite-on Automotive Corporation, Kaoshiung (TW)

( * ) Notice: Subject to any disclaimer, the term of this patent is extended or adjusted under 35 U.S.C. 154(b) by 0 days.

(21) Appl. No.: 10/255,061

(22) Filed: Sep. 25, 2002

(65) Prior Publication Data

US 2004/0066289 A1 Apr. 8, 2004

(51) Int. Cl.$^7$ .............................................. B60C 23/00
(52) U.S. Cl. ............. 340/447; 340/426.13; 340/426.16; 340/426.17; 340/426.18; 340/426.33; 340/442; 701/2; 701/29
(58) Field of Search ................................ 340/447, 442, 340/445, 449, 457, 426.15, 426.12, 426.13, 426.16, 426.17, 426.18, 426.21, 426.22, 426.24, 426.33; 73/146.5, 146.2, 146; 701/2, 29; 702/184

(56) References Cited

U.S. PATENT DOCUMENTS

| | | | |
|---|---|---|---|
| 4,383,242 A | | 5/1983 | Sassover et al. |
| 5,973,592 A | | 10/1999 | Flick |
| 6,259,362 B1 | * | 7/2001 | Lin ............................. 340/457 |
| 6,429,773 B1 | * | 8/2002 | Schuyler ................... 340/425.5 |
| 6,438,467 B1 | * | 8/2002 | Pacsai ............................. 701/2 |
| 6,448,892 B1 | * | 9/2002 | Delaporte ................... 340/442 |
| 6,463,798 B2 | * | 10/2002 | Niekerk et al. ............ 73/146.2 |
| 6,518,876 B1 | * | 2/2003 | Marguet et al. ............. 340/447 |

OTHER PUBLICATIONS

Co-pending U.S. patent application Ser. No. 09/910,725.

* cited by examiner

*Primary Examiner*—Davetta W. Goins
(74) *Attorney, Agent, or Firm*—Stevens, Davis, Miller & Mosher, LLP.

(57) ABSTRACT

A vehicle security system with a tire monitoring device comprises at least one vehicle sensor for detecting unauthorized actions, at least one sensor module, a controller and a remote unit. The sensor module is attached to a tire of a vehicle for sensing the tire conditions and transmitting a first radio frequency signal including the tire conditions. The controller is attached to the vehicle, and is used for generating a plurality of signals of security system conditions in response to the at least one vehicle sensor and for receiving and operating the first radio frequency signal including the tire condition. The controller then is used for transmitting a second radio frequency signal including the security system condition signals and the tire conditions. The remote unit receives the second radio frequency signal and generates a plurality of remote indications for showing the security system conditions and the tire conditions.

13 Claims, 2 Drawing Sheets

VEHICLE SECURITY SYSTEM WITH TIRE MONITORING DEVICE

BACKGROUND OF THE INVENTION

1. Field of the Invention

This present invention generally relates to a vehicle security system and more particularly to a vehicle security system with tire monitoring function.

2. Description of the Related Art

A tire monitoring device is widely used within a modern vehicle to monitor all tire conditions such as the pressure of the tire. As shown in FIG. 1, a typical tire monitoring system 1 is disclosed and substantially comprises a tire monitoring electric module (E/M) 10 and four sensor modules 20a, 20b, 20c, and 20d. Each one of the sensor modules 20a, 20b, 20c, and 20d, which are attached to the front-left tire, front-right tire, rear-left tire and rear-right tire of a vehicle, respectively, has a sensor 22 and a transmitter 24 with an antenna 25. The sensor 22 is used to detect the condition of the corresponding tire. The transmitter 24 is connected to the sensor 22 for transmitting an encoded signal of the tire condition to the tire monitoring E/M 10 in a wireless transmission manner. The tire monitoring E/M 10 substantially comprises a controller 12, a receiver 14 with an antenna 15, and an output device such as a display unit 16. The receiver 14 receives the encoded signal from the transmitter 24. The controller 12, connected to the receiver 14 and the display unit 16, decodes the encoded signal and then outputs it to the display unit 16 such that the vehicle driver realizes the tire condition.

However, when the driver is out of the vehicle and some abnormal situations occur in any tire of the vehicle, the driver can't realize the tire condition by means of the display unit 16. For example, if the tire is pierced during driving, and the tire pressure does not decrease below the predetermined operation range when the vehicle is parked, the driver will not know the tire condition until the vehicle is used next time. The driver shall urgently need to change the tire or call the technician.

Furthermore, the security device is well known in the art of a vehicle. The typical security device of a vehicle substantially includes a controller and a remote receiver. The controller is installed in the vehicle and connected to a plurality of sensors for detecting the opening of the trunk, hood, doors, windows, and the movement of the vehicle or in the vehicle. Ultrasonic and microwave motion detectors, vibration sensors, sound discriminators, differential pressure sensors, and switches may also be used as sensors. The controller also typically operates to give an alarm indication, such as a flashing of the lights and a sounding of the vehicle horn or a siren, in the event of triggering of a vehicle sensor. In addition, the vehicle fuel supply and/or ignition power may be selectively disabled based upon an alarm condition.

The remote receiver is usually carried by the driver and receives the alarm indication transmitted from the controller so as to indicate the event of triggering of the vehicle sensor to the driver if the driver is not in the vehicle. The remote receiver also has one or more transmitters to arm and disarm the controller in the vehicle. The known security devices of the vehicle have been disclosed in U.S. Pat. No. 4,383,242 issued to Sassover et al. on May 10, 1983 and U.S. Pat. No. 5,973,592 issued to Flick on Oct. 26, 1999. However, the controller of the security device can not serve as the tire monitor E/M and the receiver thereof can not be used to receive the signals of the tire conditions.

Accordingly, there exist needs for providing a tire monitoring device that comprises a remote unit for showing the conditions of the tires of the vehicle, whereby the driver remote from the vehicle can also realize the tire conditions.

SUMMARY OF THE INVENTION

It is an object of the present invention to provide a vehicle security system which comprises a remote unit for showing the tire condition, whereby the driver remote from the vehicle can also realize the tire conditions.

To achieve the aforementioned objects, the present invention provides a vehicle security system with a tire monitoring device which comprises at least one vehicle sensor, at least one sensor module, a controller and a remote unit. The sensor module is attached to a tire of a vehicle for sensing the tire conditions and transmitting a first radio frequency signal including the tire conditions. The controller is attached to the vehicle, and is used for generating a plurality of signals of security system conditions in response to the at least one vehicle sensor and for receiving and operating the first radio frequency signal including the tire condition. The controller then is used for transmitting a second radio frequency signal including the security system condition signals and the tire conditions. The remote unit receives the second radio frequency signal and generates a plurality of remote indications for showing the security system conditions and the tire conditions.

According to another aspect of the present invention, the present invention provides a tire monitor system which comprises at least one sensor module, a controller, and a remote unit. The sensor module is attached to a tire of a vehicle for sensing the tire conditions and transmitting a first radio frequency signal including the tire conditions. The controller is attached to the vehicle for receiving and operating the first radio frequency signal including the tire condition and for transmitting a second radio frequency signal including the tire conditions. The remote unit is used for receiving the second radio frequency signal and generating a plurality of remote indications for showing the tire conditions.

Therefore, the driver can realize the conditions of the tire and the vehicle security by means of a remote unit. The monitoring of the tire conditions further facilitates the vehicle security when the tire of the vehicle is pierced on purpose. The driver or the vehicle user can realize the conditions of the tire at any time and place.

BRIEF DESCRIPTION OF THE DRAWINGS

Other objects, advantages, and novel features of the invention will become more apparent from the following detailed description when taken in conjunction with the accompanying drawings.

DETAILED DESCRIPTION OF THE PREFERRED EMBODIMENT

Figure 1:
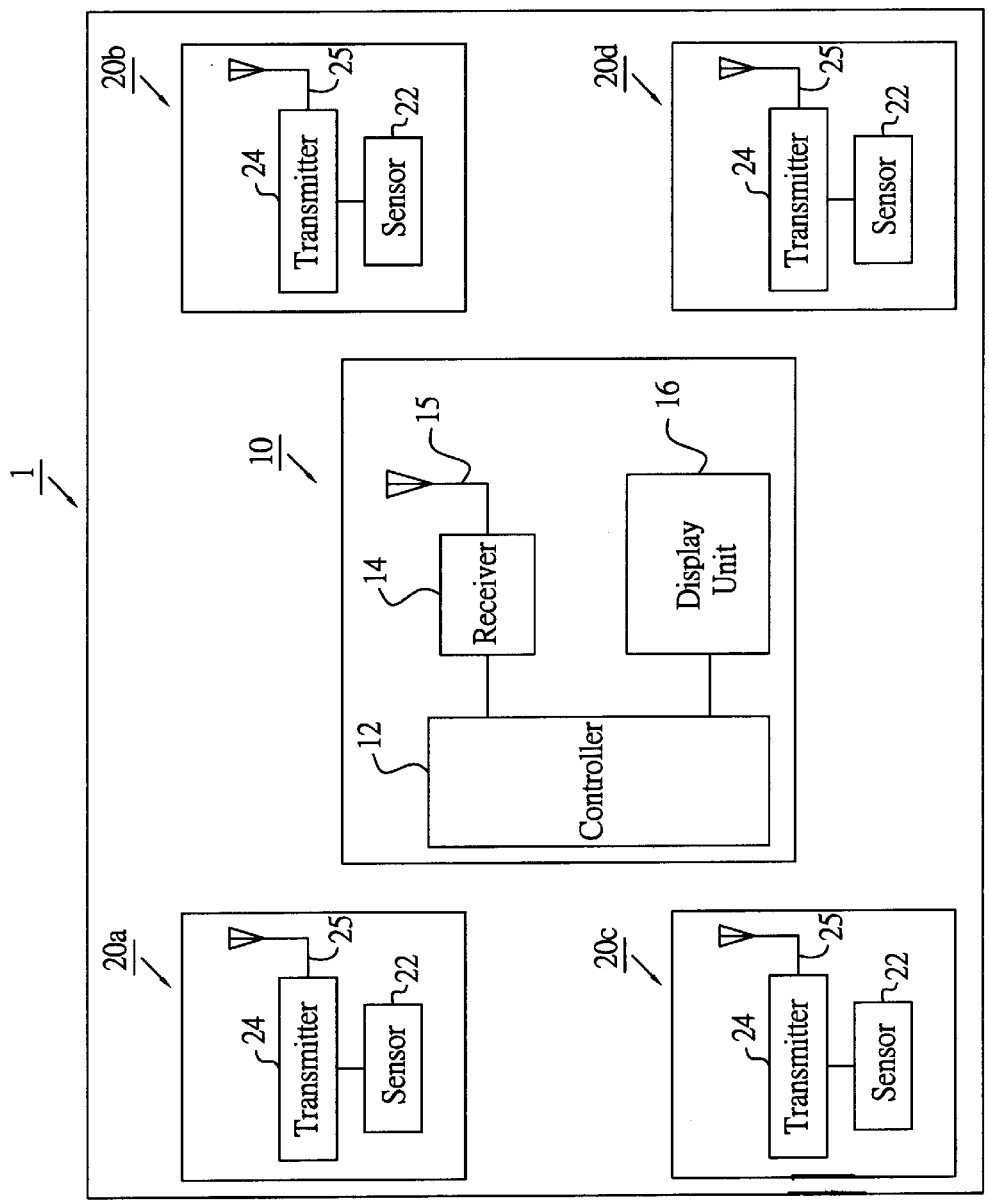
FIG. 1 is a schematic block diagram of a conventional tire monitoring device installed within a vehicle.

While the present invention is susceptible of embodiments in various forms, the present invention will be described more fully hereinafter with the specific embodiments shown in the drawings by way of an example. It is to be understood that the present disclosure is to be considered as an exemplification of the invention and is not intended to limit the invention to the specific embodiments illustrated.

Figure 2:
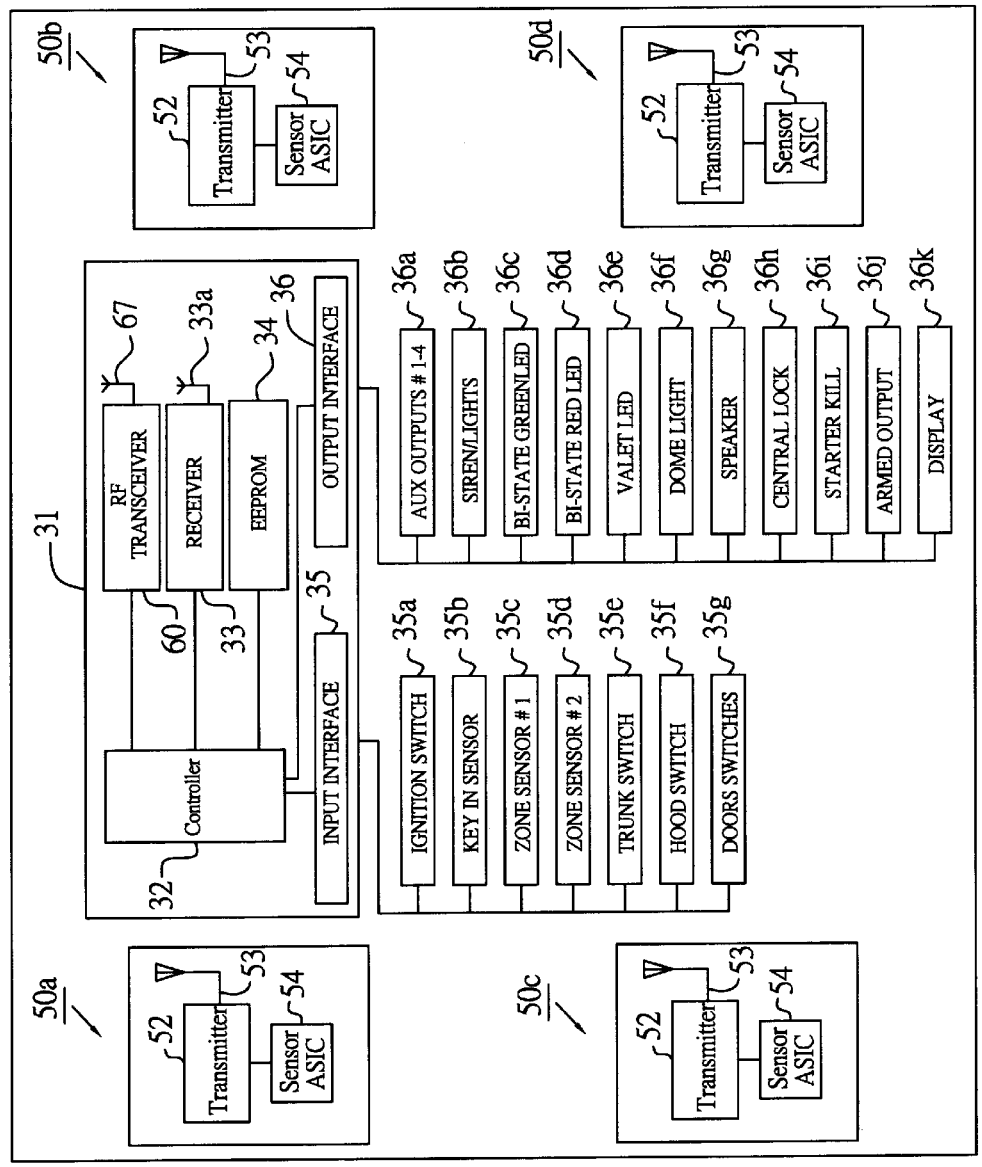
FIG. 2 is a schematic block diagram of a vehicle security system according to the present invention.

First, referring to FIG. 2, it shows a schematic block diagram of a vehicle security system 30 with a remote control unit 40 according to the present invention. The vehicle security system 30 according to the present invention comprises a central electric module 31, four sensor modules 50a–50d, a radio frequency (RF) transceiver 60, and a remote control unit 40.

The central electric module 31 substantially comprises a controller 32, a receiver 33 with an antenna 33a, a RF transceiver 60 with an antenna 67, a memory 34, an input interface 35, and an output interface 36.

The controller 32 is used to determine whether unauthorized action has been attempted and whether a plurality of local indications should be generated. The RF transceiver 60 is connected to the controller 32 for receiving signals from the transceiver 47 of the remote control unit 40. The input interface 35 is connected to various inputs of security including an ignition switch 35a, a key in sensor 35b, two zone sensors 35c, 35d, and trunk, hood and door switches 35e, 35f, and 35g, respectively. The output interface 36 of the central electric module 31 may be connected to a plurality of outputs for generating the local indications. The outputs may include auxiliary relay outputs 36a, such as for window control or remote starting, siren/lights 36b, green/red LEDs 36c, 36d, a valet LED 36e, a dome light 36f, a speaker 36g, a central lock 36h, a starter kill circuit 36i, an armed relay output 36j, and an display 36k. The memory 34 is an EEPROM so as to avoid losing of the data saved in the memory 34 while the electric power is dead.

The remote control unit 40 comprises buttons 42, an LCD display 43, a microprocessor 46, and a transceiver 47. The transceiver 47 transmits signals to the controller 32 of the central electric module 31 via the RF transceiver 60 and receives signals from the controller 32 via the RF transceiver 60. The LCD 43 is used for showing the vehicle security conditions as the remote indications. It will be appreciated that the remote control unit 40 also comprises varied indicator, such as siren and vibrator, for generating the indications in response to the signals transmitted from the controller 32. The similar vehicle security device has been disclosed in U.S. Pat. No. 5,973,592 entitled "Vehicle security system including a remote unit that emulates security system condition local indications and related method" issued to Flick on Oct. 26, 1999. This patent is expressly incorporated herein by reference in its entirety.

In FIG. 2, the sensor modules 50a, 50b, 50c and 50d are installed in the front-left tire, front-right tire, rear-left tire and rear-right tire of a vehicle, respectively. Each of the sensor modules 50a, 50b, 50c and 50d comprises a transmitter 52 with an antenna 53 and a sensor Application-Specific Integrated Circuit (ASIC) 54. The sensor ASIC 54 senses the conditions of the tire, such as pressure, temperature and acceleration, and then encodes them to a radio frequency (RF) signal. The transmitter 52 is connected to the sensor ASIC 54 for transmitting the RF signal of the encoded tire condition to the receiver 33. The similar sensor module and transceiver have been disclosed in U.S. patent application Ser. No. 09/910,725, filed on Jul. 24, 2001, and commonly assigned to the assignee of the present application. This application is expressly incorporated herein by reference in its entirety.

The central electric module 31 according to the present invention is disposed within the vehicle, and the remote control unit 40 is held by the driver or the vehicle user for verifying the security and tire conditions of the vehicle. The RF transceiver 60 comprises a multiplexer (not shown), a radio frequency (RF) electric module (not shown), and an antenna 67. The controller 32 is electrically connected to the multiplexer, the RF electric module, and the antenna 67 in series. The receiver 33 receives the RF signals of the encoded tire condition from the sensor modules 50a, 50b, 50c and 50d, and the controller 32 can be used to decode the RF signals so as to realize the conditions of the tires and determine whether the conditions of the tires are abnormal. Then, when the controller 32 determines that the conditions of the tires are abnormal, the controller 32 transmits a RF signal via the multiplexer, the RF electric module and the antenna 67 to the remote control unit 40 such that the driver can realize the abnormality of the conditions of the tires immediately. The remote control unit 40 comprises the LCD 43 for showing the conditions of the tires of the vehicle. Furthermore, the conditions of the tires are saved in the memory 34 and the controller 32 can be actuated by pressing the button of the remote control unit 40 such that the driver can read the tire conditions if the driver desires.

Additionally, the remote control unit 40 comprises a microprocessor 46, a transceiver 47 with an antenna 47a, a plurality of buttons 42, and an LCD (liquid display device) display 43. The transceiver 47 is connected to the microprocessor 46 for receiving the RF signal of the decoded tire condition from the RF transceiver 60. The buttons 42 are connected to the microprocessor 46 for generating various control commands such as enabling an arming state and monitoring the tire conditions. Those skilled in the art will appreciate that other output indicators such as a speaker and an LED can be substituted for the LCD display 43 or further connected to the microprocessor 46.

Therefore, the driver can realize the conditions of the tires and the security by means of a single remote unit. The monitoring of the tire conditions further facilitates the security of the vehicle when the tire of the vehicle is pierced on purpose. The driver or the vehicle user can realize the conditions of the tire at any time and place.

While the foregoing description and drawings represent the preferred embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure arrangement, proportions, materials, elements, and components and otherwise, used in the practice of the invention, which are particularly adapted to specific environments and operating requirements without departing from the principles of the present invention. The presently disclosed embodiments are therefore to be considered in all respects as illustrative and not restrictive, the scope of the invention being indicated by the appended claims and their legal equivalents, and not limited to be the foregoing description.

What is claimed is:

1. A vehicle security system with a tire monitoring device for a vehicle with tires, comprising:

at least one vehicle sensor;

at least one sensor module attached to a tire of the vehicle for sensing a condition of the tire and transmitting a first radio frequency signal including information on said condition of the tire;

a controller attached to the vehicle for (i) generating a plurality of signals of security system conditions in response to the at least one vehicle sensor, (ii) for receiving and processing the first radio frequency signal, and (iii) for transmitting a second radio frequency signal including information contained in said plurality of signals of security system conditions and information contained in the first radio frequency signal on said condition of the tire; and a remote unit for receiving the second radio frequency signal and generating a plurality of remote indications for showing the security system conditions and said condition of the tire.

2. The vehicle security system as claimed in claim 1, further comprising a plurality of outputs connected to the controller for generating a plurality of local indications.

3. The vehicle security system as claimed in claim 2, wherein the remote unit further comprises a transmitter for transmitting a third radio frequency signal and the controller further comprises a transceiver for receiving the third radio frequency signal such that the remote unit controls the controller and further controls the outputs.

4. The vehicle security system as claimed in claim 3, wherein the transceiver is used for transmitting the second radio frequency signal.

5. The vehicle security system as claimed in claim 1, wherein the remote unit further comprises an LCD (liquid crystal display) for showing the remote indications.

6. The vehicle security system as claimed in claim 1, wherein the condition of the tire comprises at least one of pressure, temperature, and acceleration of the tire.

7. A vehicle security system with a tire monitoring device for a vehicle with tires, comprising:

at least one vehicle sensor;

at least one sensor module attached to a tire of the vehicle for sensing a condition of the tire and transmitting a radio frequency signal including information on the condition of the tire; and a controller attached to the vehicle for generating a plurality of signals of security system conditions in response to the at least one vehicle sensor and for receiving and processing the radio frequency signal including the information on said condition of the tire.

8. The vehicle security system as claimed in claim 7, further comprising a plurality of outputs connected to the controller for generating a plurality of indications.

9. The vehicle security system as claimed in claim 7, wherein the condition of the tire comprises at least one of pressure, temperature, and acceleration of the tire.

10. The vehicle security system as claimed in claim 1, wherein the sensor module further comprises an antenna for transmitting the first radio frequency signal.

11. The vehicle security system as claimed in claim 1, wherein the sensor module further comprises a sensor Application-Specific Integrated Circuit (ASIC) for sensing the condition of the tire.

12. The vehicle security system as claimed in claim 7, wherein the sensor module further comprises an antenna for transmitting the radio frequency signal.

13. The vehicle security system as claimed in claim 7, wherein the sensor module further comprises a sensor Application-Specific Integrated Circuit (ASIC) for sensing the tire conditions.

* * * * *